United States Patent Office 3,558,294
Patented Jan. 26, 1971

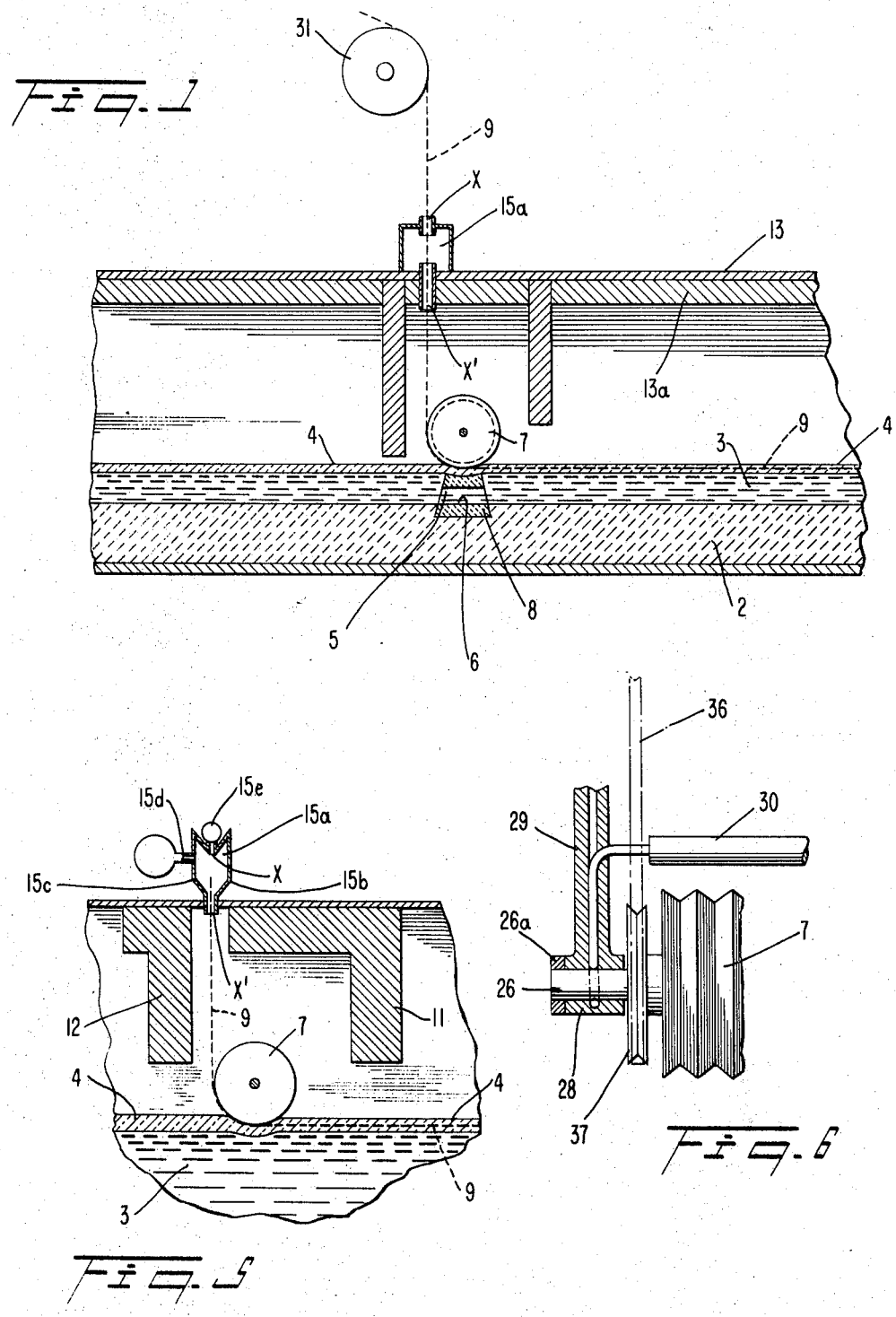

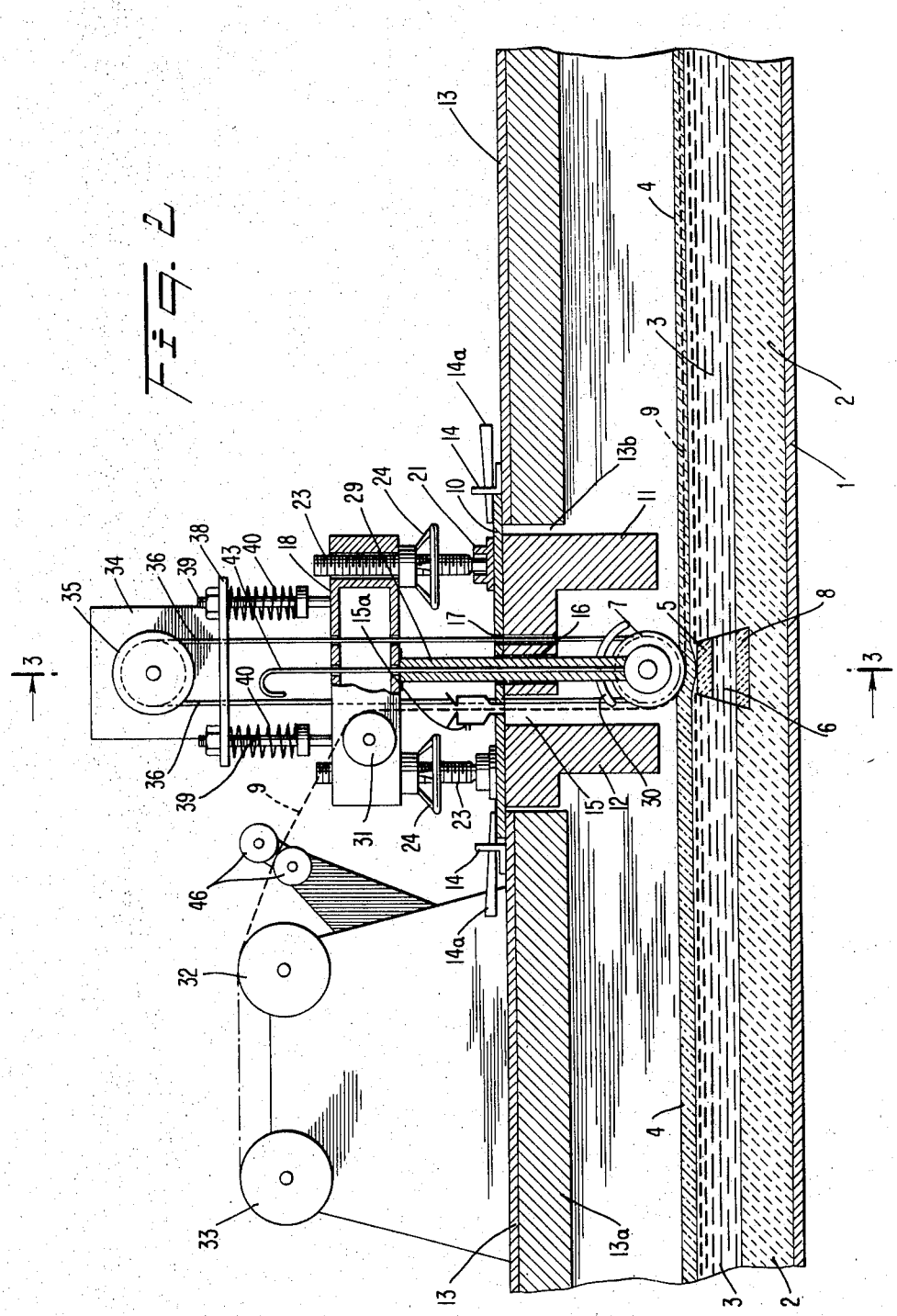

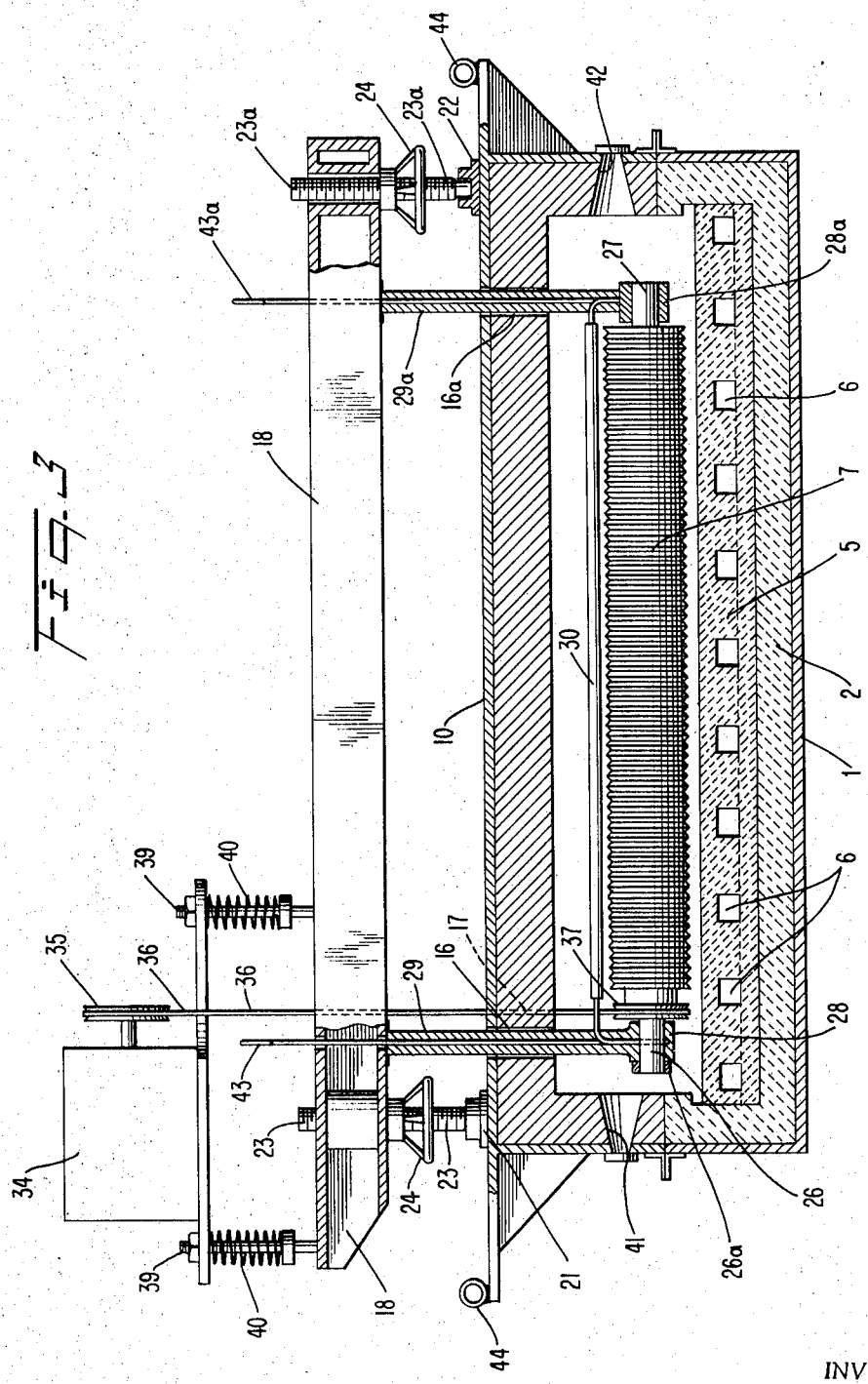

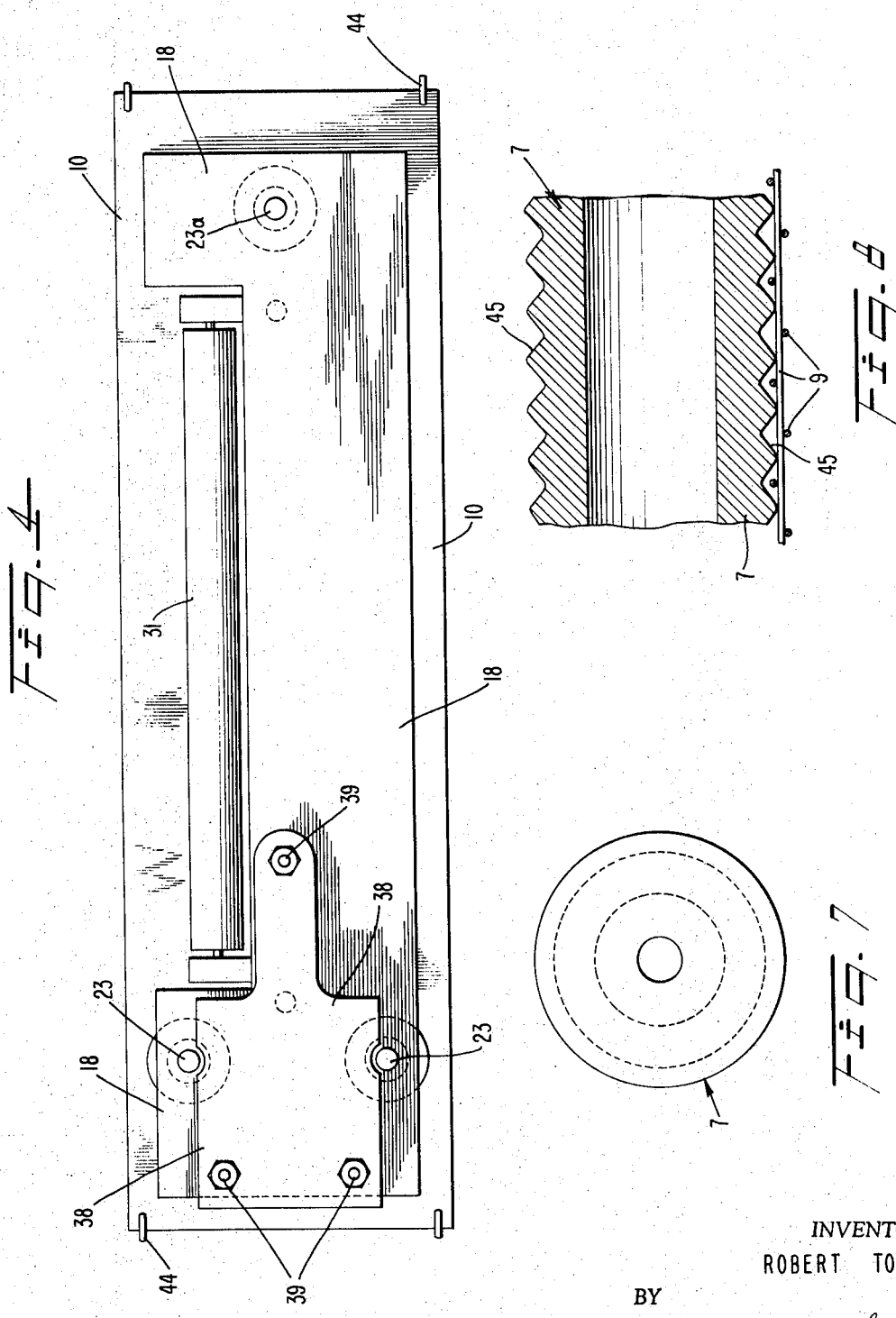

3,558,294
MANUFACTURE OF ARMORED GLASS
Robert Touvay, Paris, France, assignor to Compagnie de Saint-Gobain, Neuilly-sur-Seine, France
Filed Feb. 20, 1968, Ser. No. 706,837
Claims priority, application France, Feb. 21, 1967, 95,780
Int. Cl. C03b 13/12, 18/00
U.S. Cl. 65—51        13 Claims

ABSTRACT OF THE DISCLOSURE

Armored glass of improved appearance and superior optical qualities is produced by inserting the armor into the glass while it is floating on the surface of a molten metal bath. Sophisticated apparatus is provided for the purpose.

---

This invention relates to the manufacture of armored glass which, in its general meaning, intends glass within the body of which a reinforcement has been included, usually as metal wire—linear or woven. The advantages of armored glass are numerous including retention of the pieces if the glass breaks, good resistance to fire, and continued protection against a breakthrough.

Many processes and reinforcements have been used to make armored glass, a common method being to introduce wire or wire mesh of refractory metal into the interior of flat glass while it is being made. Among the imperfections of such processes are that they produce a product of degraded appearance and transparency, so that to produce armored glass having good optical quality, it must be ground and polished mechanically on both faces, which is costly, suffers from breakage losses arising from the heterogeneity of structure, and is only possible when the quality of the melt and the method of combining the mesh with the sheet are of the best.

It is an object of this invention to produce armored glass of superior appearance and optical properties without grinding and polishing and to provide apparatus of novel construction and accurate adjustability to carry out the process.

The object of the invention as to apparatus are accomplished by apparatus for making armored flat glass which comprises a furnace containing a molten flotation bath, means to move a ribbon of flat glass along the furnace on the bath, means to insert armor in the glass on the bath through a surface thereof, and means to maintain the glass downstream of the means to insert armor at a temperature which closes the fissures made in the glass by the armor, levels the surface, and imparts a fire polish thereto.

The objects of the invention as to process are accomplished by introducing the armor into the flat glass while it is on the surface of a flotation bath, the flotation bath being maintained at a temperature which closes the fissures caused by the insertion of the armor and levels and fire polishes the surface, the flotation bath downstream of that region being progressively cooled to a temperature at which the armored glass can be removed without surface damage.

The process according to the invention will be described in relation to the introduction of a wire mesh, it being understood that the method can be applied to any type of armor, particularly those involving wire or other metallic bands.

In the preferred form of the invention a sheet of glass will be formed by rolling or otherwise from a mass of molten glass, laid on a typical flotation bath of molten metal, for instance molten tin or molten salt, and allowed to stabilize itself under the forces of surface tension and gravity, for instance 6.5 mm., whereupon the armor is pressed through one surface, in a region of the furnace where the temperature is at least 900°–950° C. (for ordinary glass) or higher and is maintained at this temperature long enough for the fissures made by the introduction of the armor to close, the surface to level itself and acquire a fire polish after which the glass may be progressively cooled until it can be handled without surface damage.

The insertion of the metallic armor is accomplished advantageously by a horizontal roller which is deeply grooved with circular grooves, the roller being arranged with its axis perpendicular to the flow of the glass ribbon. The roller is maintained at a level which efficiently presses the armor into the mid-thickness of the glass. The roller is driven mechanically at a peripheral speed equal to the speed of the glass.

In order to avoid submerging the glass in the molten metal, a submerged support is placed beneath the roller and parallel to it. This support may be a bar or material which is not attacked by the molten metal, such as graphite. The top of this support is slightly beneath the surface of the molten metal, so that during its passage between them, the soft glass sheet is slightly depressed by the roller but is not submerged.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical longitudinal section through that part of a furnace wherein wire mesh is being inserted in a sheet of glass moving toward the right along a bath of molten metal;

FIG. 2 is a similar section illustrating details of the apparatus;

FIG. 3 is a cross section on the line 3—3 of FIG. 2;

FIG. 4 is a diagrammatic plan view of the supporting frames which carry the armoring apparatus;

FIG. 5 is a detail related to the introduction of the armor, in longitudinal section;

FIG. 6 illustrates apparatus for controlling the temperature of the roller (cylinder) and its bearings;

FIGS. 7 and 8 are details of the roller in end view and longitudinal section respectively.

Referring to FIG. 1 the apparatus includes a furnace 1, 2, 3, 13, 13a having a metal exterior, a refractory bed 2, which contains a metal bath 3 which may be presumed in this instance to be molten tin. On the surface of the flotation bath a sheet or ribbon of flat glass 4, which has been formed by some known method and introduced to the metal bath off the picture at the left, having taken its equilibrium thickness, approaches the grooved roller 7 which is so mounted as to depress the glass as it passes underneath. Beneath the roller 7 is a bar 5 of graphite which extends the width of the furnace just below the surface thereof. This bar is seated in the bed of the furnace in an undercut groove and its top prevents the sheet of glass from being submerged when pressed by the roller 7. This bar is provided with tubes 6 which permit the bath to flow through it. The upper part 13 of the furnace has an inner refractory lining 13a through which a rectangular opening 13b (FIG. 2) extends from side to side transversely. A plate 10 closes opening 13b and supports depending refractory baffles 11, 12. The plate is retained between brackets 14 and held in position by wedges 14a. A slot 15 passes through the plate transversely of the furnace, surmounted through its whole length by a trap 15a through which the armor 9 passes. The trap 15a is shown in detail on FIG. 5 where it appears to involve two shaped metal sheets 15b, 15c which establish upper and lower openings x, x' for the passage of the wire and the obstruction of heat loss. The plate 15c includes one or more appendages 15d for the introduction of inert or reducing gases under low pressure to protect the wire and prevent heat loss. Because of its shape, the upper opening x formed by two sheets 15b, 15c, in the absence of the armor, can be closed by putting a metal pipe 15e over it. The plate 10 also has openings 16, 16a for the passage of tubular supports 29 (FIGS. 3 and 6) connected to the bearings 26, 28 for the grooved roller. It also has opening 17 for the passage of driving cable 36 which engages the pulley 37 mounted on the shaft of the roller.

Above the plate 10 is a hollow frame 18 which is supported horizontally on jacks 23, 23, 23a which co-operate with manual nuts 24 which permit the exact setting of the roller with respect to the sheet of glass. The jacks 23 are retained in fixed cups 21 on the plate 10, whereas the jack 23a is mounted in a cup 22 which is permitted linear sliding movement to compensate for thermal changes in size of the parts of the apparatus.

From the inner surface of the frame 18 are suspended columns 29, 29a which pass through the openings 16, 16a and support bearings 28, 28a which receive the axles 26, 27 of the roller 7. One of these bearings is provided with known means 26a to retain the bearing 26 in fixed position, whereas the other may move axially through its bearing sleeve for thermally induced differences in size. The pulley 37 is fixed on the axle 26 and is driven by cable 36 from pulley 35 of motor 34. This motor is fixed on a plate 38 attached to the upper portion of frame 18 by columns 39 and springs 40 which absorb vibrations, compensate for the effects of temperature, and keep the cable tight. Similarly to the frame 18 the plate 38 has tripod support, which is preferred.

Columns or brackets 29, 29a are hollow and receive a flow of water or other cooling fluid which passes through the bearing 28 to a pipe 30 arranged over the roller (FIG. 6) so that the cooling fluid passes around the bearings, across the length of the roller, through the other bearing, and out through the other column. The cooling liquid is introduced by conduit 43 and discharged through conduit 43a. Other cooling systems can be employed.

At its upstream end the frame 18 carries a free roller 31 which guides the mesh from sources of supply 32, 33 through trap 15 to the grooved roller 7. The armor has any inequalities eliminated by passage between offset rollers 46 before leaving roller 31.

The lateral walls of the furnace near the roller 7 are provided with apertures 41, 42 for inspection of the operation of introducing the armor into the glass. Rings 44 are provided at opposite ends of the plate 10 to permit its adjustment or removal. The roller 7 has circular grooves 45 which may satisfactorily be in the form of equilateral triangles with rounded crests. Tension can be kept on the mesh by light braking applied to roller 32 or 33 which is supplying the armor.

The operation of the invention is as follows:

Armor from roll 32 or 33 passes to offset rollers 46 which flatten it and deal it to roller 31 from whence it passes through trap 15 to the summits of the lands of the grooved roller which is driven at the same peripheral speed as the sheet of glass 4 and presses the armor into the sheet, midway as shown in FIG. 2, the sheet being prevented from submerging during this operation by the presence of the bar 5. Fissures occur in the upper surface of the glass where the armor has penetrated but the temperature of the furnace downstream of the grooved roller is such that the fissures close, the surface levels itself, and a fire polish is applied. After the fissures have disappeared and the fire polish has appeared, the moving sheet of glass is gradually cooled until it can be removed and handled by mechanical means without damage. When ordinary glass of the sort which is employed in windows is being made, temperatures upward of 900° C. are necessary for this purpose. For other types of glass, other temperatures will be employed.

In some instances the bar 5 is not necessary, particularly when the temperature of the sheet of glass 4 is high enough to endow the glass with great fluidity.

The advantages of the invention include a product of superior appearance and optical properties which have been achieved without grinding and polishing, reduction in breakage loss, and an improved yield due to the elimination of those substantial losses of material which occur during grinding and polishing. The apparatus is capable of minute control and perfect orientation. Its temperature control is adequate to long life. Other advantages are in the accomplishment of the stated objects of the invention.

As many apparently widely different embodiments of the present invention may be made without departing from the spirit and scope thereof, it is to be understood that the invention is not limited to the specific embodiments.

What is claimed is:

1. Apparatus for making reinforced flat glass, comprising, a furnace containing a molten metal flotation bath, means to move a ribbon of flat glass along said furnace on the surface of the bath therein, first means to insert reinforcement into the ribbon on the bath throughout the width of the ribbon, and second means downstream of said first means, to maintain the ribbon at a temperature which effects closure of the fissures made in the surface of the ribbon by insertion of the reinforcement, levels and smooths the surface, and imparts a fire polish thereto.

2. The apparatus of claim 1, said first means including a roller within the furnace and extending substantially throughout the width of the ribbon, said roller having its lower periphery disposed below the level of the upper surface of the ribbon, bracket means journaling said roller for rotation on its axis, and means to adjust said bracket means, to vertically adjust the position of said axis.

3. The apparatus of claim 2, the surface of said roller being formed throughout its effective length with axially-spaced circular groves.

4. The apparatus of claim 2, said bracket means extending exteriorly of the furnace and there including jacks adjustably supporting said roller.

5. The apparatus of claim 2, and supporting means for the ribbon submerged in the flotation bath beneath said roller.

6. The apparatus of claim 4, said bracket means including means to compensate for thermal changes in furnace dimensions.

7. The apparatus of claim 3, said bracket means including bearings journaling the respective ends of said roller, one said bearing permitting axial movement of the contiguous end of the roller to provide for thermal changes in axial dimension thereof.

8. The apparatus of claim 2, said bracket means including first and second bearings within the furnace and journaling therein the respective ends of said roller, first conduit means connected with said first bearing to supply coolant thereto, second conduit means connected with said second bearing to exhaust coolant therefrom, and heat exchange jacket means superposed over and adjacent to said roller, said jacket means having communication at its respective ends, with said first and second conduit means, whereby to protect said roller and said bearings against the temperature within said furnace.

9. The apparatus of claim 1, and power means connected with said roller to rotate the same at essentially the same peripheral speed as the rate of linear movement of the ribbon of glass.

10. The apparatus of claim 8, and first and second walls of heat insulating material depending from the roof of said furnace, substantially coextensive with and upon the upstream and downstream sides, respectively, of said roller, adjacent thereto.

11. The method of manufacturing reinforced sheet glass, comprising, passing a ribbon of molten sheet glass on and along a bath of molten metal, and guiding a strip of reinforcement having essentially the same width as the ribbon, into the ribbon at a line transversely thereof, while maintaining the temperature of the ribbon downstream of said line, sufficiently high to close the fissures formed by entry of the reinforcement into the ribbon, and to smooth the surface thereof.

12. The method of claim 11, and supporting the ribbon at said line beneath the same and within the molten metal bath.

13. The method of claim 11, and providing solid backing support for the ribbon at and along said line, beneath the surface of the molten metal bath.

References Cited

UNITED STATES PATENTS

| | | | |
|---|---|---|---|
| 1,392,626 | 10/1921 | Cox | 65—356X |
| 1,945,695 | 2/1934 | Kingsley | 65—147X |
| 3,413,107 | 11/1968 | De Lajarte et al. | 65—182X |

ARTHUR D. KELLOGG, Primary Examiner

U.S. Cl. X.R.

65—182, 147